No. 871,717. PATENTED NOV. 19, 1907.
C. E. LYTER.
SAFETY ATTACHMENT FOR AIR BRAKE SYSTEMS.
APPLICATION FILED AUG. 17, 1907.

UNITED STATES PATENT OFFICE.

CHARLES E. LYTER, OF HARRISBURG, PENNSYLVANIA

SAFETY ATTACHMENT FOR AIR-BRAKE SYSTEMS.

No. 871,717.  Specification of Letters Patent.  Patented Nov. 19, 1907.

Application filed August 17, 1907. Serial No. 389,065.

*To all whom it may concern:*

Be it known that I, CHARLES E. LYTER, a citizen of the United States, residing at Harrisburg, in the county of Dauphin and State of Pennsylvania, have invented a certain new and useful Improvement in Safety Attachments for Air-Brake Systems, of which the following is a specification.

This invention relates to safety devices for air brake systems, and it has for its object to provide a simple, durable, and inexpensive device adapted for attachment to or insertion in the train line pipe of the system in order to prevent accidents which might arise from the bursting of the hose pipe connection of the line pipes between the cars of the train, and it consists in the parts and combinations of parts hereinafter described and claimed.

Figure 1:
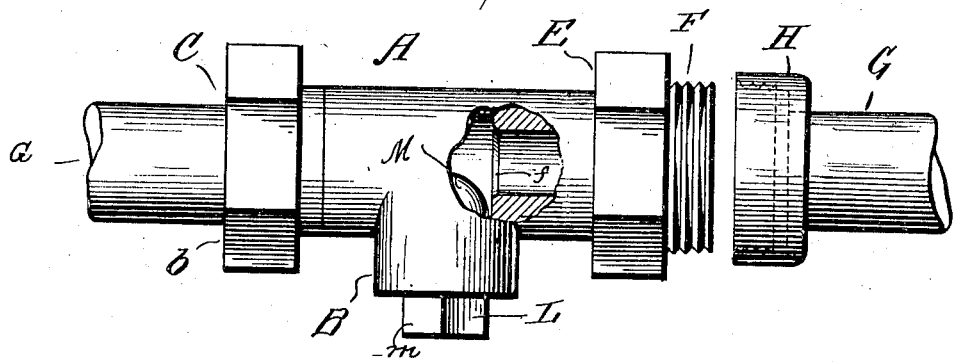
Figure 2:
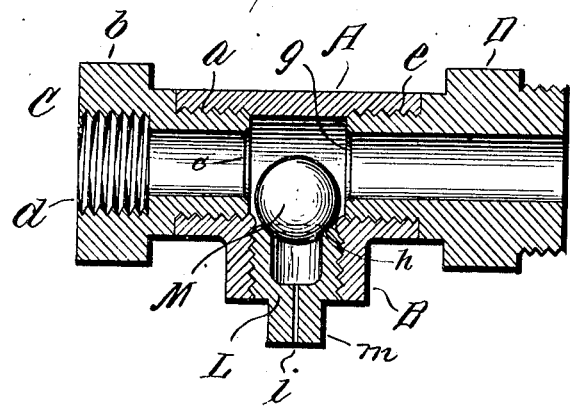
Figure 3:
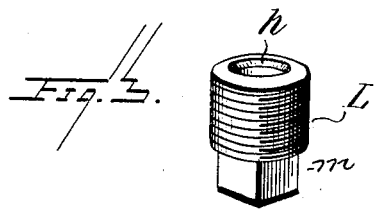

In the accompanying drawings, forming a part of this specification, Figure 1 is a side elevation of my improved device partly broken away to show the interior. Fig. 2 is a longitudinal vertical section through the same. Fig. 3 is a detail perspective view of the perforated plug.

Similar letters refer to similar parts throughout the several views.

Referring to the drawings A represents a short length of pipe having a branch B and forming a tee coupling. At one end the pipe A is interiorly threaded, as at $a$, to receive the coupling nipple C which is shouldered, as at $b$, to provide for the application of a wrench. The nipple C is exteriorly threaded to adapt it to screw into the pipe A and its end is beveled, as at $c$, to form a valve seat, and it is also interiorly threaded, as at $d$, to receive the threaded end of the line pipe G. The opposite end of the pipe A may also be interiorly threaded, as at $e$, Fig. 2, to receive the exteriorly threaded end of a double threaded shouldered nipple D; or the said end may be formed in one piece with the shoulder E and the exteriorly threaded extension F to which the line pipe G may be connected or coupled by a sleeve H as shown in Fig. 1.

If the pipe A is made in one piece to receive the sleeve, as described, a valve seat $f$ will be formed therein as shown in Fig. 1, and, if not, and the nipple D is employed the end of the latter will be beveled, as at $g$, to form the valve seat as shown in Fig. 2.

The lateral branch B is interiorly threaded to receive the threaded plug L, the end of which is beveled, as at $h$, to form a valve seat for the ball valve M which normally rests thereon. The plug L is perforated lengthwise, as at $i$, in order to provide for the slow escape of the air in the event of the bursting of the hose. The plug is also formed with a square or hexagonal extension $m$ to enable the application of a wrench or spanner to adjust the same in the branch.

One of the devices is applied at each end of each car composing the train. With the ball in the position shown in full lines in Fig. 2, that is to say resting on the seat of the plug L, and with the train line pipes and coupling hose under air pressure, the air pressure will hold the ball down on its seat on said plug, but if either the hose or train line pipe should burst the sudden and forcible escape of the air will lift the ball from its plug seat and force it against the seat $c$ or $g$, according to the direction in which the air is escaping or flowing and there hold it while the air is slowly escaping through the aperture $i$ in the plug L. The slow escape of the air through said aperture gradually applies the brakes to the cars in rear of the break in the hose or in the train line pipe and thus prevents the sudden and violent application of the brakes to the train. In the meantime the engineer is able to control the movement of the front end of the train. When the air pressure becomes reduced by reason of the escape of the air through the plug aperture the ball will drop down onto the plug seat.

It will be observed that the plug L may be adjusted in the branch B to different heights in order to place the ball valve in the proper position to act according to the air pressure.

Having thus described my invention what I claim as new and desire to secure by Letters Patent is:

1. An air brake safety attachment comprising a pipe adapted for connecting a train line pipe and having a laterally extending tubular branch, an adjustable plug fitting in said branch and formed with an aperture therethrough, and a ball valve adapted to close said aperture.

2. An air brake safety attachment comprising a pipe adapted for connecting a train line pipe and having a tubular branch, an adjustable plug for said branch formed with an aperture therethrough, and a ball normally resting on said plug and adapted to cut off the flow of air through the train line pipe, and permit a retarded flow of air through the plug.

In testimony whereof, I affix my signature, in the presence of two witnesses.

CHARLES E. LYTER.

Witnesses:
   CHARLES LOWELL HOWARD,
   M. A. SMITH.